(12) United States Patent
Goossens et al.

(10) Patent No.: US 7,631,137 B2
(45) Date of Patent: Dec. 8, 2009

(54) DATA PROCESSING SYSTEM AND METHOD FOR CONVERTING AND SYNCHRONISING DATA TRAFFIC

(75) Inventors: Kees Gerard Willem Goossens, Eindhoven (NL); Andrei Radulescu, Eindhoven (NL); Edwin Rijpkema, Nieuwerkerk a/d Ijssel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 229 days.

(21) Appl. No.: 11/720,211

(22) PCT Filed: Nov. 30, 2005

(86) PCT No.: PCT/IB2005/053971

§ 371 (c)(1),
(2), (4) Date: May 25, 2007

(87) PCT Pub. No.: WO2006/059284

PCT Pub. Date: Jun. 8, 2006

(65) Prior Publication Data

US 2008/0012736 A1    Jan. 17, 2008

(30) Foreign Application Priority Data

Dec. 1, 2004    (EP) .................................. 04106210

(51) Int. Cl.
*G06F 13/00* (2006.01)
(52) U.S. Cl. .......................... 710/315; 710/29; 710/316
(58) Field of Classification Search .................. 710/29, 710/307, 313–317
See application file for complete search history.

(56) References Cited

U.S. PATENT DOCUMENTS

| | | | |
|---|---|---|---|
| 5,935,232 A | 8/1999 | Lambrecht et al. | |
| 6,018,782 A | 1/2000 | Hartmann | |
| 6,104,696 A | 8/2000 | Kadambi et al. | |
| 7,373,449 B2 * | 5/2008 | Radulescu et al. | 710/316 |
| 2002/0044568 A1 * | 4/2002 | Smiljanic | 370/468 |
| 2003/0110339 A1 | 6/2003 | Calvignac et al. | |
| 2003/0208566 A1 | 11/2003 | Weber et al. | |
| 2006/0153228 A1 * | 7/2006 | Stahl et al. | 370/466 |

FOREIGN PATENT DOCUMENTS

EP    0959411 A1    11/1999

OTHER PUBLICATIONS

Edwin Rijpkema, et al: A Router Architecture for Networks on Silicon, in Proceedings of Progress, Oct. 2001, pp. 1-8, Veldhoven the Netherlands.
E. Rijpkema, et al: Trade Offs in the Design of a Router with Both Guaranteed and Best-Effort Services for Networks on Chip, in Proc. Design, Mar. 2003, pp. 350-055.
Andrei Radulescu, et al: An Efficient on-Chip Network Interface Offering Guaranteed Services, Shared-Memory Abstraction, and Flexible Network Configuration, in Proc. Design, 2004, pp. 1-6.
John Dielissen, et al: Concepts and Implementation of the Philips Networks-on-Chip, in IP-Based Soc Design, Nov. 2003, pp. 1-6.

* cited by examiner

*Primary Examiner*—Glenn A Auve

(57) ABSTRACT

A data processing system and a method for synchronizing data traffic including a conversion unit which converts first data into second data. The first data is controlled by a first scheme for reservation of resources and the second data being controlled by a second scheme for reservation of resources. The conversion unit may be referred to as a network-level bridge (NWB). For example, the different schemes for reservation of resources may be based on slot tables, in which case, the conversion unit converts the slot assignments for the first data into the slot assignments for the second data.

13 Claims, 8 Drawing Sheets

DATA PROCESSING SYSTEM AND METHOD FOR CONVERTING AND SYNCHRONISING DATA TRAFFIC

The invention relates to a data processing system on at least one integrated circuit, the data processing system comprising at least two modules and an interconnect arranged to transmit data between the modules, wherein the interconnect comprises a first sub-interconnect and a second sub-interconnect, the first sub-interconnect using a first scheme for reservation of resources and the second sub-interconnect using a second scheme for reservation of resources.

The invention also relates to a method for converting data in a data processing system on at least one integrated circuit, the data processing system comprising at least two modules and an interconnect which transmits data between the modules, wherein the network comprises a first sub-interconnect and a second sub-interconnect, the first sub-interconnect using a first scheme for reservation of resources and the second sub-interconnect using a second scheme for reservation of resources.

Networks-on-Chip (NoC's) have been proposed and widely accepted as an adequate solution for the problems relating to the interconnection of modules on highly complex chips. Compared to conventional interconnect structures such as single busses or hierarchies of busses, the network concept offers a number of important advantages. For example, (i) networks are able to structure and manage wires in deep sub-micron technologies satisfactorily, (ii) they allow good wire utilization through sharing, (iii) they scale better than busses, (iv) they can be energy-efficient and reliable, and (v) they decouple computation from communication through well-defined interfaces, which enables that the modules and the interconnect structure can be designed in isolation and integrated relatively easily.

A Network-on-Chip typically comprises a plurality of routers, which form the nodes of the network and which are arranged to transport and route the data through the network. Furthermore, the network is usually equipped with so-called network interfaces, which implement the interface between the modules connected to the network and the network itself. The modules are usually categorized into master modules and slave modules. The master modules send request messages to the slave modules, for example a request message comprising a write command accompanied by data which should be written in a memory (slave) module. The slave module may send back a response message including an acknowledgement of the receipt of the request message, or an indication of the success of the write operation requested by the master module. The request-response mechanism is often referred to as the transaction model. The combination of a request and a corresponding response is often referred to as a transaction. Other types of network can be used, which for example use message passing. The invention also relates to these other types of network.

Networks-on-Chip constitute a rapidly evolving area of research and development. In recent years many publications have been made, for example about network topologies or the design of components such as network interfaces, routers and switches. An important recent development is the concept of multi-chip networks. Multi-chip networks are divided into sub-networks which are dedicated to the communication between modules forming part of a sub-system and performing specific functions in a larger data processing system. The sub-networks reside on different integrated circuits (dies, chips, packages or boards). Alternatively, sub-networks may reside on a single chip. In the latter case they may have different power or voltage domains, or different other characteristics.

In the context of the present invention U.S. Pat. No. 6,018,782 is particularly relevant. U.S. Pat. No. 6,018,782 discloses a single chip integrated circuit which comprises a plurality of modules interconnected in an on-chip network. The modules are processors or memory devices or hybrids. An inter-module link provides an electrical path for data communication among the modules. The modules are connected to the inter-module link by inter-module ports, with at least one inter-module port coupled between an associated module and the inter-module link. The inter-module link electrically couples the inter-module ports and provides a communications pathway between the modules. The on-chip network may also include an inter-module network switch for joining circuits of the inter-module link and routing data packets from one inter-module links to another or an inter-chip network bridge to join two single chip integrated circuits into a single communications network and route data packets from modules on one computer chip to modules on another computer chip.

The inter-chip network bridge is capable of joining two computer chips to extend the on-chip network through a number of connectors, as can be seen in FIGS. 2 and 5 of U.S. Pat. No. 6,018,782. The inter-chip network bridge preferable includes one or more output buffers which operate to accept outgoing data destined for an address on a second computer chip, and one or more input buffers operable to receive incoming data destined for an associated address on the associated computer chip. The inter-chip network bridge accepts data to be transferred to the second computer chip into an output buffer when space in the output buffer is available. The data in the output buffer is transferred to a corresponding inter-chip network bridge on the second computer chip through the connectors, if the latter inter-chip network bridge signals availability to accept additional data.

It is apparent from the description of U.S. Pat. No. 6,018,782 that the network bridge only applies to communication between networks residing on different integrated circuits, and that it only comprises buffer means for temporarily storing data which should be transmitted from one network to another. There is no mechanism for synchronization of data transfer from one network to another. The facilities offered by the network bridge are very limited in the sense that it only offers a possibility to couple the network to another chip and thereby extend the network. It further provides relatively simple buffer means to queue data when a corresponding network bridge (comprised in the network on the other computer chip) indicates that it cannot accept additional data. Hence, a major disadvantage of this network bridge is that it cannot adequately synchronize the data traffic from one network to another in the case that the different sub-networks have different performance characteristics.

It is also apparent that two components are needed, in particular a network bridge on a first computer chip and a cooperating network bridge on a second computer bridge, the combination of which negatively affects the performance of the network as a whole due to an increased latency. The negative effect on the performance is another disadvantage of the known network bridge.

It is an object of the invention to provide a means and a method for interconnecting sub-networks of the kind set forth, which means and method are able to synchronize the data traffic between the sub-networks in the case that the different sub-networks have different characteristics.

The invention relies on the perception that the lack of synchronization of data traffic is primarily caused by the use of different schemes for reservation of resources. According to the invention, a conversion unit is provided which converts first data into second data, the first data being controlled by a first scheme for reservation of resources and the second data being controlled by a second scheme for reservation of resources. The conversion unit may be referred to as a network-level bridge. For example, the different schemes for reservation of resources may be based on slot tables, in which case the conversion unit converts the slot assignments for the first data into the slot assignments for the second data.

In an embodiment of the invention, the first scheme for reservation of resources is conceived to reserve bandwidth for the transmission of the first data, and the second scheme for reservation of resources is conceived to reserve bandwidth for the transmission of the second data. Hence, the conversion unit is arranged to convert data controlled by a first scheme for reserving bandwidth into data controlled by a second scheme for reserving bandwidth.

In an embodiment of the invention, as claimed in claim 3, the first scheme for reservation of resources is the same as the second scheme for reservation of resources. For example, both schemes may be based on the use of TDMA slot tables.

According to an aspect of the invention, the first scheme for reservation of resources and the second scheme for reservation of resources comprise slot tables for controlling the transmission of data. This is a common technique for reserving time slots in a network environment; the routers comprise so-called TDMA slot tables in which data elements are allocated to time slots.

In an embodiment of the invention, the first sub-interconnect and the second sub-interconnect deploy different slot table sizes, and the conversion unit is arranged to convert the slot assignments for the first data into the slot assignments for the second data.

In another embodiment of the invention, the first sub-interconnect and the second sub-interconnect have different operating frequencies, and the conversion unit is arranged to convert the slot assignments for the first data into the slot assignments for the second data.

In a further embodiment of the invention, the first data and the second data are formatted with different word widths, and the conversion unit is arranged to convert the slot assignments for the first data into the slot assignments for the second data.

According to a further aspect of the invention, the first sub-interconnect and the second sub-interconnect reside on different integrated circuits. This is often referred to as a multi-chip interconnect.

According to a further aspect of the invention, the first sub-interconnect and the second sub-interconnect reside on a single integrated circuit, and the first sub-interconnect and the second sub-interconnect have different power and/or voltage domains. The first sub-interconnect and second sub-interconnect have different performance characteristics. For example, the conversion unit can then also be used to relax the slot allocation.

The present invention is described in more detail with reference to the drawings, in which.

Figure 1A:
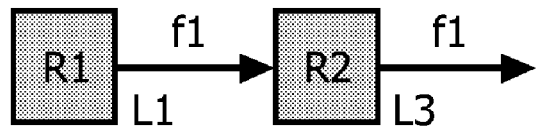
FIG. 1A illustrates a known configuration of communicating routers in a network on an integrated circuit.

FIG. 1A illustrates a known configuration of communicating routers R1, R2 in a network on an integrated circuit. The network comprises a collection of routers R1, R2 which are connected via links L1, L3. Both links operate at a certain clock frequency f1. Both routers R1, R2 have the same view on the link L1 between the routers in terms of performance (clock frequency, phase, bit width etc.). This is the currently prevailing Network-on-Chip view.

Figure 1B:
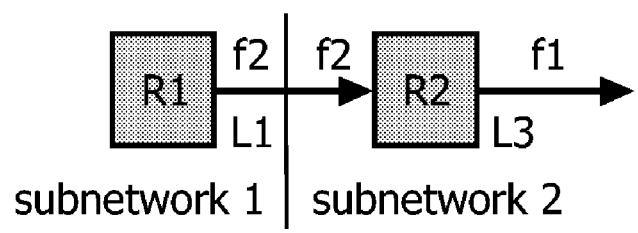
FIG. 1B illustrates a known configuration of communicating routers which are comprised in the same network, but in different sub-networks.

FIG. 1B illustrates a known configuration of communicating routers R1, R2 which are comprised in the same network, but in different sub-networks subnetwork 1, subnetwork 2. For example, the sub-networks may reside on different boards, chips or dies. Alternatively, the sub-networks may reside on a single integrated circuit, but they may have different power or voltage domains. For proper functioning of the network the routers R1, R2 should have the same view (in terms of performance) on the link L1 between them, but the performance of link L1 may be different from the performance of other links L3 in the respective sub-networks of routers R1 and R2. It is noted that the links L1 and L3 may be given an equal performance to solve this conflict, but this solution either underutilizes the link L1 between the sub-networks or it underutilizes the link L3 within a sub-network. Alternatively, the routers R1, R2 may be adapted such that they can handle data traffic through links L1, L3 having different levels of performance, but this requires modification of the routers R1, R2 and increases their complexity. The latter solution also has a negative effect on the reusability of the routers R1, R3. In either case, the solution is not good enough. It would be better to hide the properties of the link L1 between the sub-networks from the routers R1, R2, which is accomplished by the conversion unit according to the invention. Because the conversion unit according to the invention translates between schemes of resource reservation on the network-level in the OSI model, it may be referred to as a network-level bridge.

Figure 2:
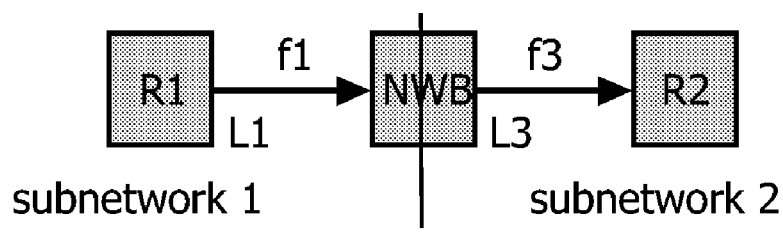
FIG. 2 illustrates a conversion unit according to the invention.

FIG. 2 illustrates a network-level bridge NWB according to the invention. The routers R1, R2 remain unchanged and the network-level bridge NWB is reusable within and across networks. The function of the network-level bridge is to hide from a router that it communicates with another router (or other component such as a network interface) which has different characteristics than it would expect. The network-level bridge is another component and for the routers and network interfaces it 'behaves' like a normal router or a hop. The network-level bridge is arranged to translate between two different sub-network network-level protocols. For example, the sub-networks subnetwork 1, subnetwork 2 may have different operating frequencies, clock phases, power domains, routing methods, flow control methods, TDMA slot table sizes, and different quality-of-service regimes.

Hereinafter an example will be presented wherein the schemes for reservation of resources are based on the use of TDMA slot tables. However, it is noted that the schemes for reservation of resources are not limited to slot-table based schemes. It is also possible to use rate-based, deadline-based and other schemes. In addition, also arbitration schemes which do not provide communication guarantees can be used, such as priority-based, round-robin, and weighted round-robin schemes. A combination of these schemes is also possible.

Figure 3:
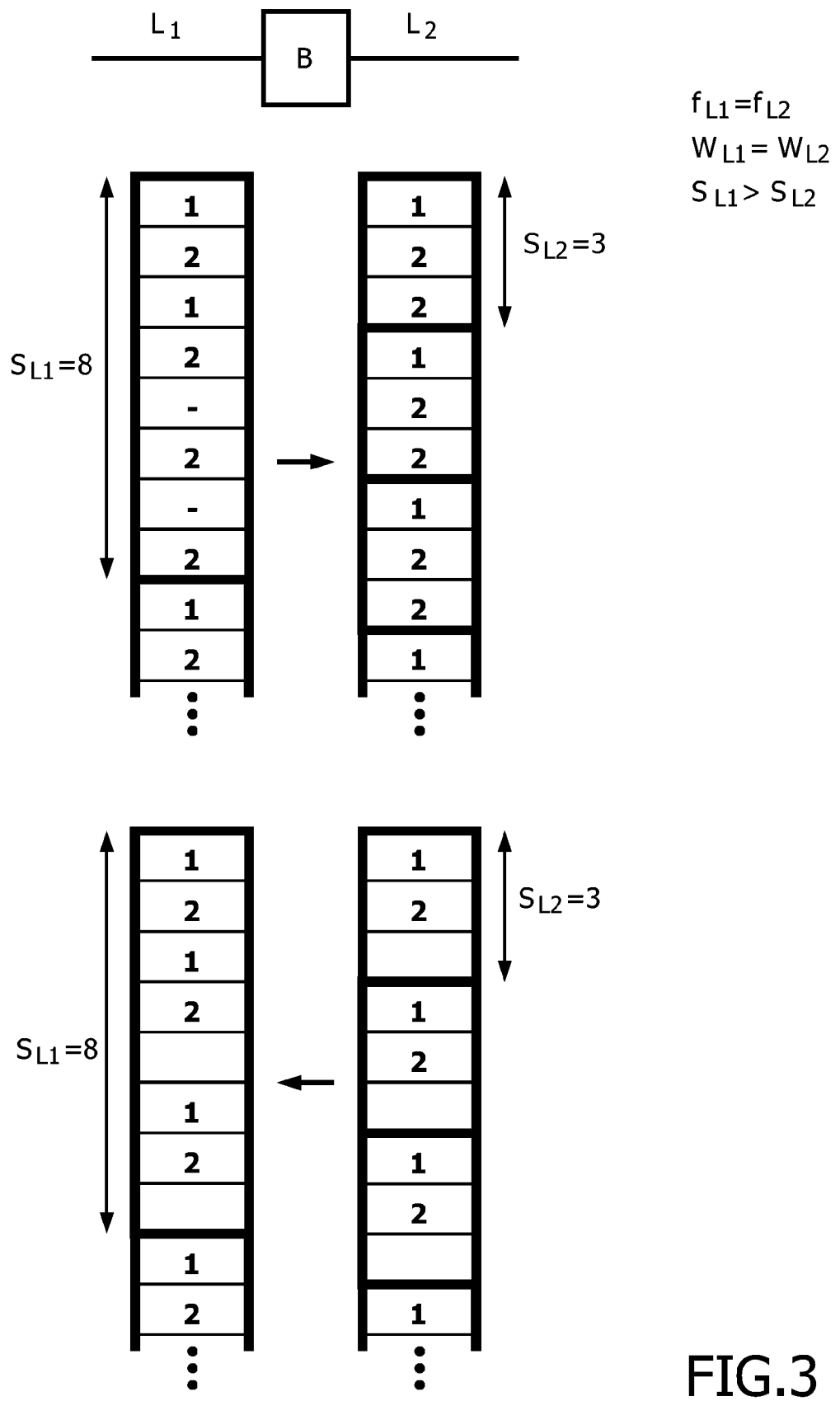
FIG. 3 illustrates a first embodiment of the conversion unit according to the invention.

FIG. 3 illustrates a first embodiment of the conversion unit B according to the invention. It gives an example of a translation of slot table assignments between a first sub-network and a second sub-network. It is assumed that the sub-networks run at the same operating frequency ($f_{L1}=f_{L2}$). The first sub-network uses a TDMA slot table size of 8 and the second sub-network uses a TDMA slot table size of 3. Furthermore, it is assumed that the word width is the same in the sub-networks. The conversion unit or network-level bridge B translates the slot assignments. In the slot table of the first sub-network two connections (identified by '1' and '2') are allocated to the time slots. Connection 1 is allocated to the first and the third time slot. Connection 2 is allocated to the second, fourth, sixth and eighth time slot. Because the second slot table $S_{L2}$ is smaller than the first slot table $S_{L1}$, the second slot table is traversed more often than the first slot table in the same amount of time. When the first slot table is traversed three times, the second slot table is traversed exactly eight times.

A connection which needs X slots in the slot table of the first sub-network, requires a reservation of Y slots in the slot table of the second sub-network. The variables X and Y conform to the following formula: $Y=\text{ceil}(X*f_{L1}/f_{L2}*S_{L2}/S_{L1})$, wherein $f_{L1}$ represents the clock/operating frequency of the first sub-network, $f_{L2}$ represents the clock/operating frequency of the second sub-network, $S_{L1}$ represents the slot table size of the first sub-network, $S_{L2}$ represents the slot table size of the second sub-network, and the function 'ceil' rounds up the result to an integer.

In the example, a first conversion takes place if data is transmitted from link $L_1$ to link $L_2$. This is depicted in the upper part of FIG. 3. The two connections 1 and 2 have reservations of respectively 2 and 4 slots on link $L_1$. This means that connection 1 needs a reservation of ceil(2*1/1*3/8)=1 slot in the second slot table. Connection 2 needs a reservation of ceil(4*1/1*3/8)=2 slots in the second slot table.

A second conversion takes place if data is transmitted back from link $L_2$ to link $L_1$. This is depicted in the lower part of FIG. 3. In that case, the value of variable X in the above-mentioned formula must be calculated according to the rewritten formula: $X=\text{ceil}(Y*f_{L2}/f_{L1}*S_{L1}/S_{L2})$. Both connections have a reservation of one slot in the second slot table, so Y=1. According to the formula each connection needs a reservation of ceil(1*1/1*8/3)=3 slots in the first slot table.

It is noted that the present invention also applies to connectionless communication, for example to protocols such as IP, UDP which don't define connections in the way that e.g. the TCP protocol does. Also, it is noted that the translation or remapping may be dependent on runtime conditions, such as the actual operating frequencies (as opposed to compile/design/synthesis time projected operating frequencies). For a meaningful translation the relative operating conditions/performance of both sub-networks must be relatively stable, i.e. not change too frequently. If they change, the translation mechanism may have to be changed, and hence also the end-to-end properties of the connections.

The end-to-end properties of a connection using multiple sub-networks are composed. For example, the connection is lossless if all sub-network sub-connections are lossless, and lossy otherwise. The connection is ordered if all sub-network sub-connections are ordered, and the network-level bridges maintain ordering, otherwise it is unordered. The connection has a guaranteed bandwidth equal to the minimum bandwidth of all sub-connections, and a latency equal to the sum of the latencies of all sub-connections, plus the latencies of the network-level bridges.

Figure 4:
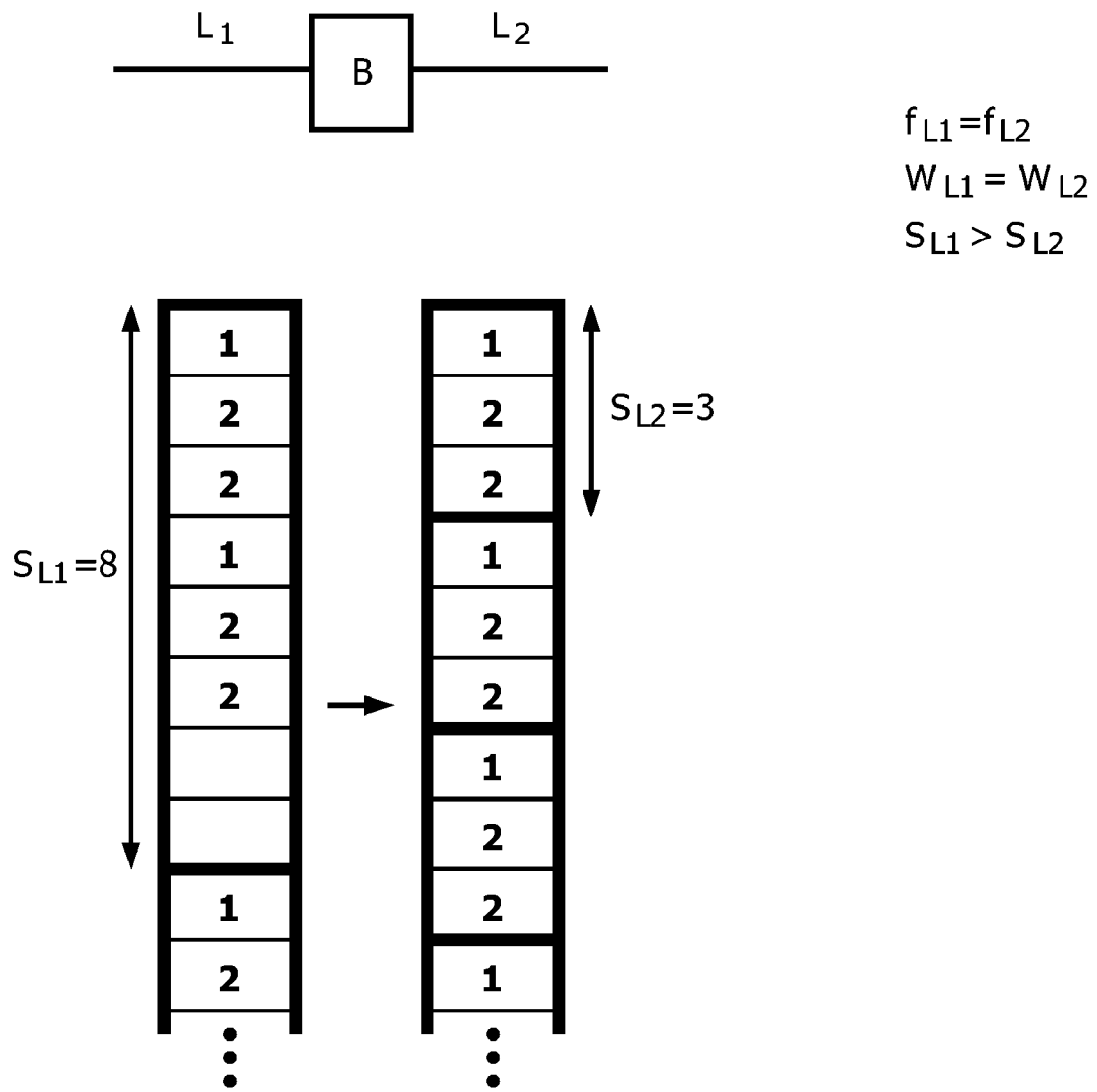
FIG. 4 illustrates a second embodiment of the conversion unit according to the invention.
Figure 8:
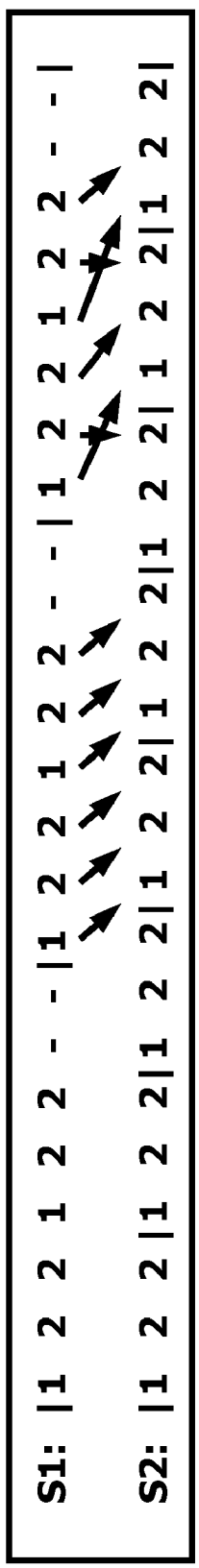
FIG. 8 illustrates the reordering of data.
Figure 9:
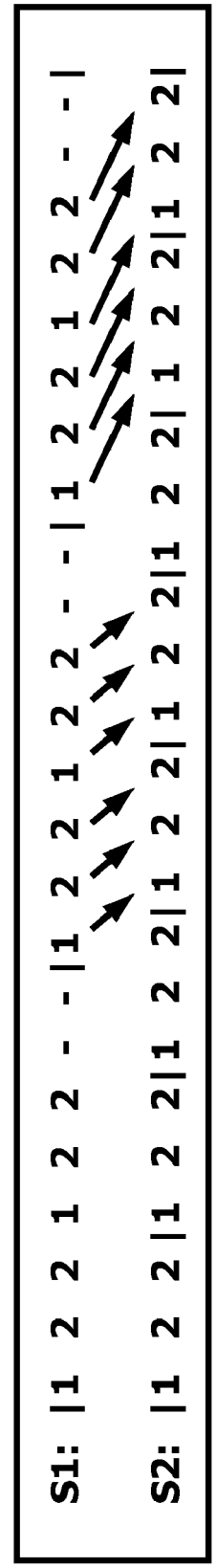
FIG. 9 illustrates a case in which no reordering of data takes place.

FIG. 4 illustrates a second embodiment of the conversion unit according to the invention. It illustrates a special case of the embodiment illustrated in FIG. 3, in the sense that an additional constraint is defined for allocating the connections to the second slot table: the order in which the data for connection 1 and 2 are received by the conversion unit must be the same as the order in which these data are sent by the conversion unit. In other words, reordering of data is not allowed. The reordering of data is illustrated in FIG. 8. A case in which no reordering of data takes place is illustrated in FIG. 9.

Referring to FIG. 4, it can be seen that the slot allocations in the first slot table and the second slot table are done in such a way that the order in which the data for connection 1 and 2 are received is preserved. If reordering of data is not allowed, the implementation becomes simpler in the sense that a single buffer queue is sufficient.

Figure 5:
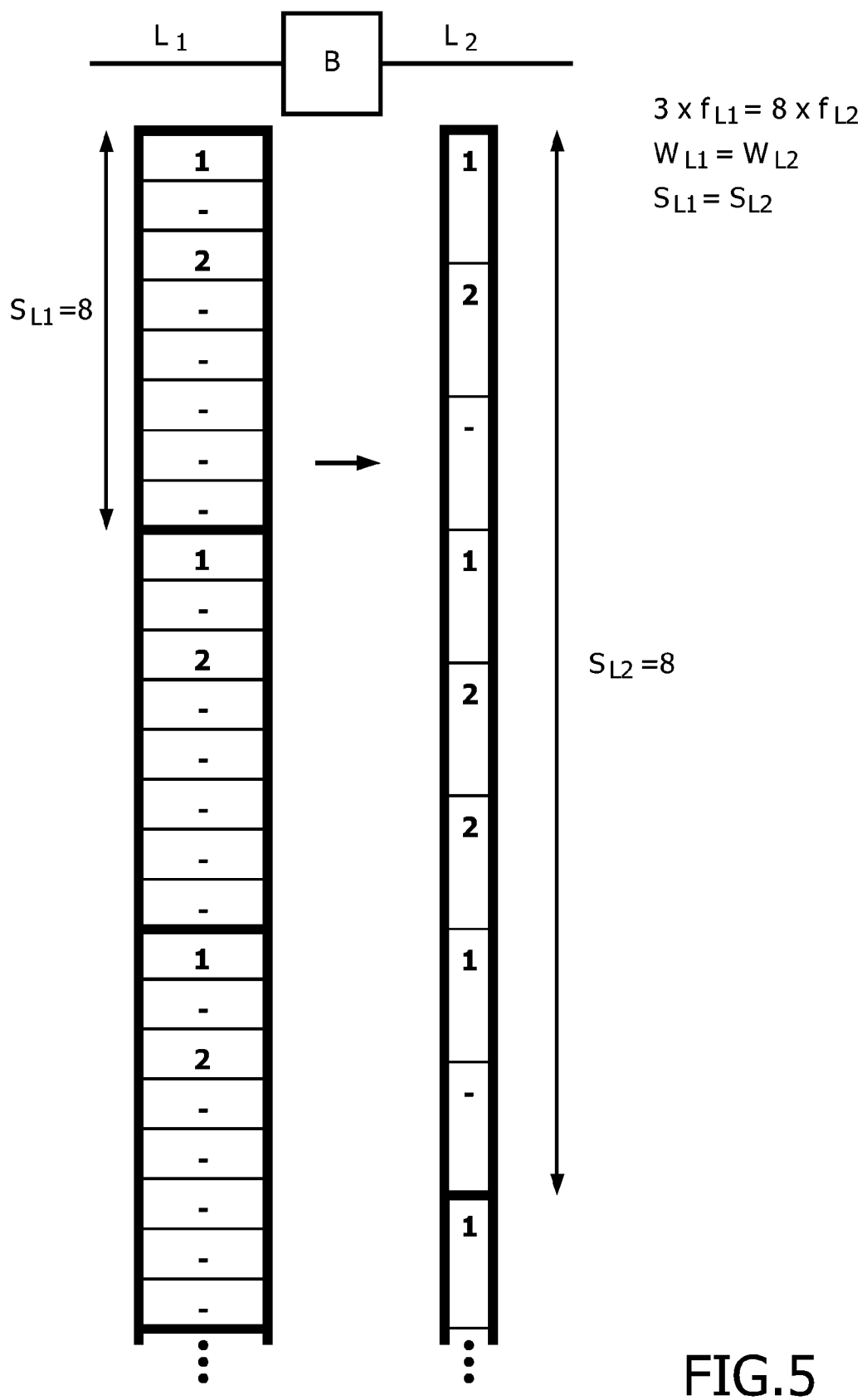
FIG. 5 illustrates a third embodiment of the conversion unit according to the invention.

FIG. 5 illustrates a third embodiment of the conversion unit according to the invention. It gives an example of operating speed conversion between a first sub-network and a second sub-network. The first sub-network operates faster than the second sub-network, according to the formula $3*f_{L1}=8*f_{L2}$. The first and the second sub-network have the same number of slots (i.e. 8 slots) in the TDMA slot tables. Also, the word width is the same in the first sub-network and the second sub-network. Again, the above-mentioned formula is used to calculate the number of slots which should be reserved for each connection: $Y=\text{ceil}(X*f_{L1}/f_{L2}*S_{L2}/S_{L1})$. For each connection 1, 2 one slot is reserved in the first slot table, so X=1. For each connection Y=ceil(1*8/3*1/1)=3 slots must be reserved in the second slot table. Note that the time slots of the first sub-network comprise a smaller amount of time than the time slots of the second sub-network, which is illustrated graphically in FIG. 5 by the relative vertical size of the time slots.

Figure 6:
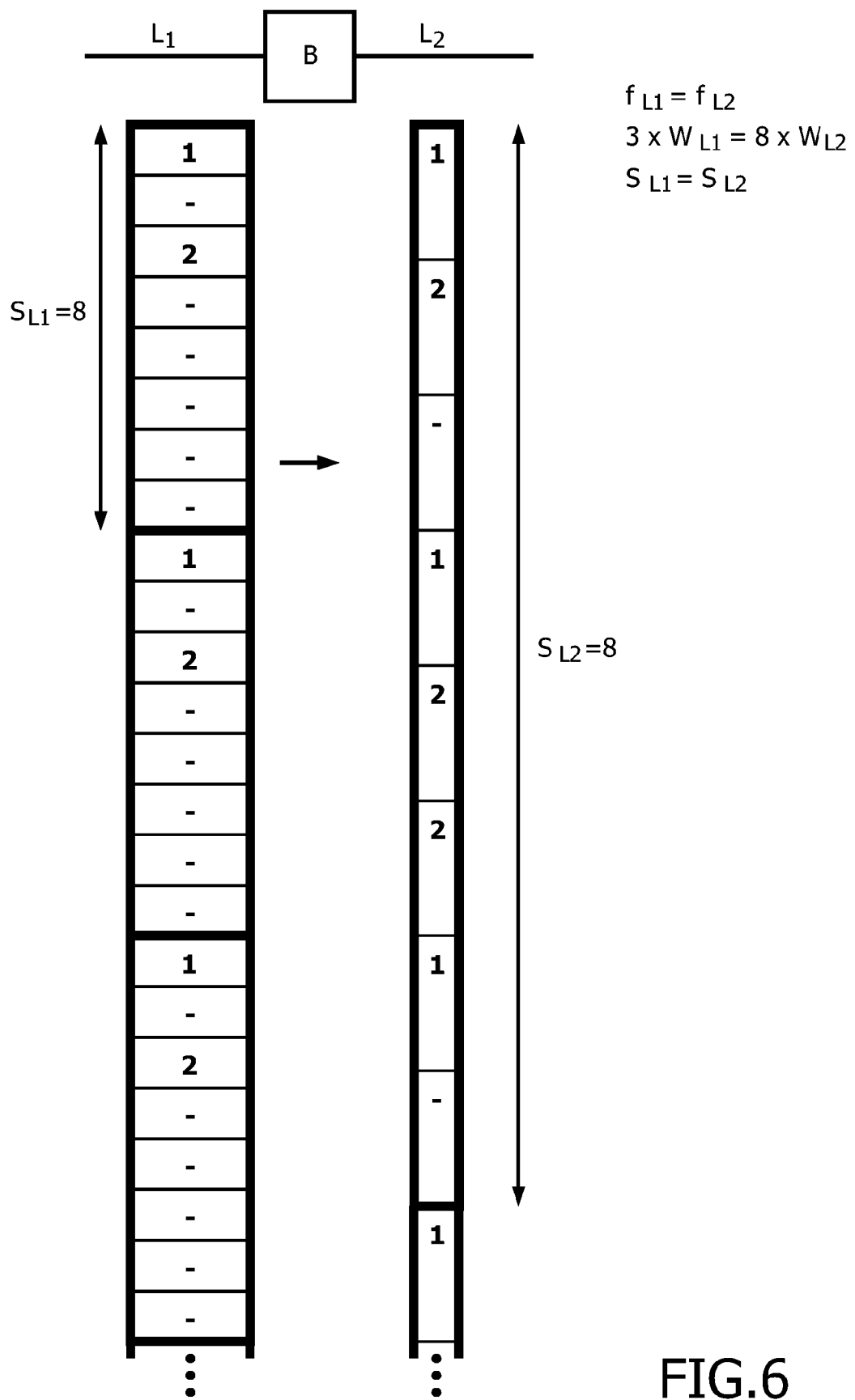
FIG. 6 illustrates a fourth embodiment of the conversion unit according to the invention.

FIG. 6 illustrates a fourth embodiment of the conversion unit according to the invention. In this case, the word width used in the first sub-network is different from the word width used in the second sub-network, according to the formula: $3*W_{L1}=8*W_{L2}$. The operating frequencies $f_{L1}$, $f_{L2}$ are the same, as well as the slot table sizes $S_{L1}$, $S_{L2}$. However, the bandwidth obtained by reducing the word width with a factor 3/8 has the same effect as reducing the operating frequency, so for the allocation of data to time slots the same approach is used as in the third embodiment illustrated in FIG. 5. Because the layout of the words may change, an additional unit should be provided in the implementation, for example a link width conversion unit as illustrated below with reference to FIG. 7A and FIG. 7B.

Figure 7A:
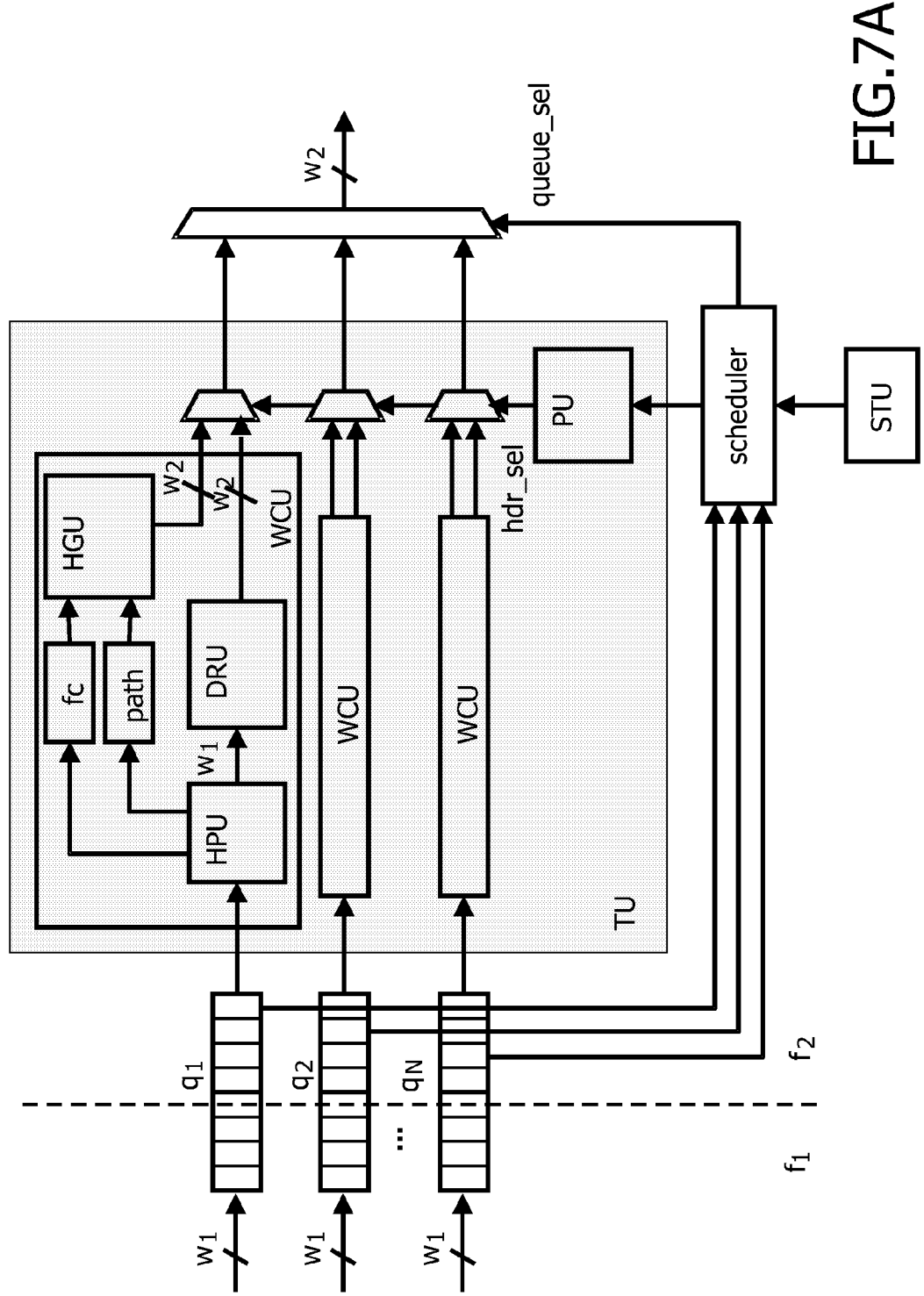
FIG. 7A illustrates a first example of an architecture for the conversion unit according to the invention.

FIG. 7A illustrates a first example of an architecture for the conversion unit according to the invention. The conversion unit comprises a number of queues $q_1, q_2, \ldots q_N$, which in combination with a scheduling unit scheduler and a slot table unit STU are arranged to provide operating frequency conversion, but not word width and slot length conversion. For the latter, a translation unit TU is provided. The translation unit comprises word conversion units WCU, a packetization unit PU and a number of multiplexers which receive data from the word conversion units WCU. As an example, the architecture of a word conversion unit WCU is shown. The word conversion unit WCU comprises a header parsing unit HPU, a data resize unit DRU, a header generation unit HGU, a flow control storage facility fc, and path information storage facility path. The word size $w_1$, $w_2$ at the input and output side of the conversion unit are typically a power of 2 bits (1, 2, 4, 8, 16, 32, or 64).

In operation, the header parsing unit HPU tracks when packet headers are transmitted and saves the information contained in header, for example path/address information in the path information storage facility path and flow control information in the flow control storage facility fc. This information is passed to the header generation unit HGU which generates the header in a new format. Also, the payload of a packet should be resized, which is performed by the data resize unit DRU. The packetization unit PU selects the transfer of packet header or payload. The packetization unit PU forms packets from the data generated by the header generation unit HGU and the data resize unit DRU. The packetization unit PU reads from the scheduler which queue is served next. Scheduling is performed based on the slot table allocations stored in slot table unit STU. If a new packet must be transferred, the packetization unit PU first passes a header, and then payload data from the selected queue. When a header is passed, it will contain a certain number of credits from the flow control storage facility fc.

The packetization unit PU is also arranged to decide when a packet is finished, i.e. it determines the packet boundaries. For example, a packet would end due to a switch to another queue. The packet boundaries may be changed from one sub-network to another sub-network. The programmer of the conversion unit must ensure that enough data and flow control bandwidth is reserved with the new packetization scheme. It is noted that this scheme allows that packets with different destinations are stored in the same queue. When a new packet is transferred from the queue to the word conversion unit WCU, a new path may be stored in 'path', and the credit information in 'fc'. In the case a new path is stored, 'fc' must contain 0, otherwise the credit throughput condition has been violated by an erroneous configuration. Typically, to avoid such a problem, the two packet formats should contain in their header a placeholder for credits of the same size. In this way, when the packet header is converted, all the credit information can just be copied to the first output packet resulting from an input packet, and, as a result, any subsequent input header will find 'fc' at zero. In the case a packet with the same path is transferred (i.e. with the same destination), the credit information is added to the old 'fc' value.

It is noted that if no packet translation is necessary, the translation unit TU can be omitted. The first level of multiplexers (within the translation unit TU) is used for the packetization process, as explained above. The second level of multiplexers (in this case the single multiplexer at the output side of the translation unit TU) is used for scheduling the data traffic from the queues to the output. The second level of multiplexers is controlled by the scheduling unit scheduler.

Figure 7B:
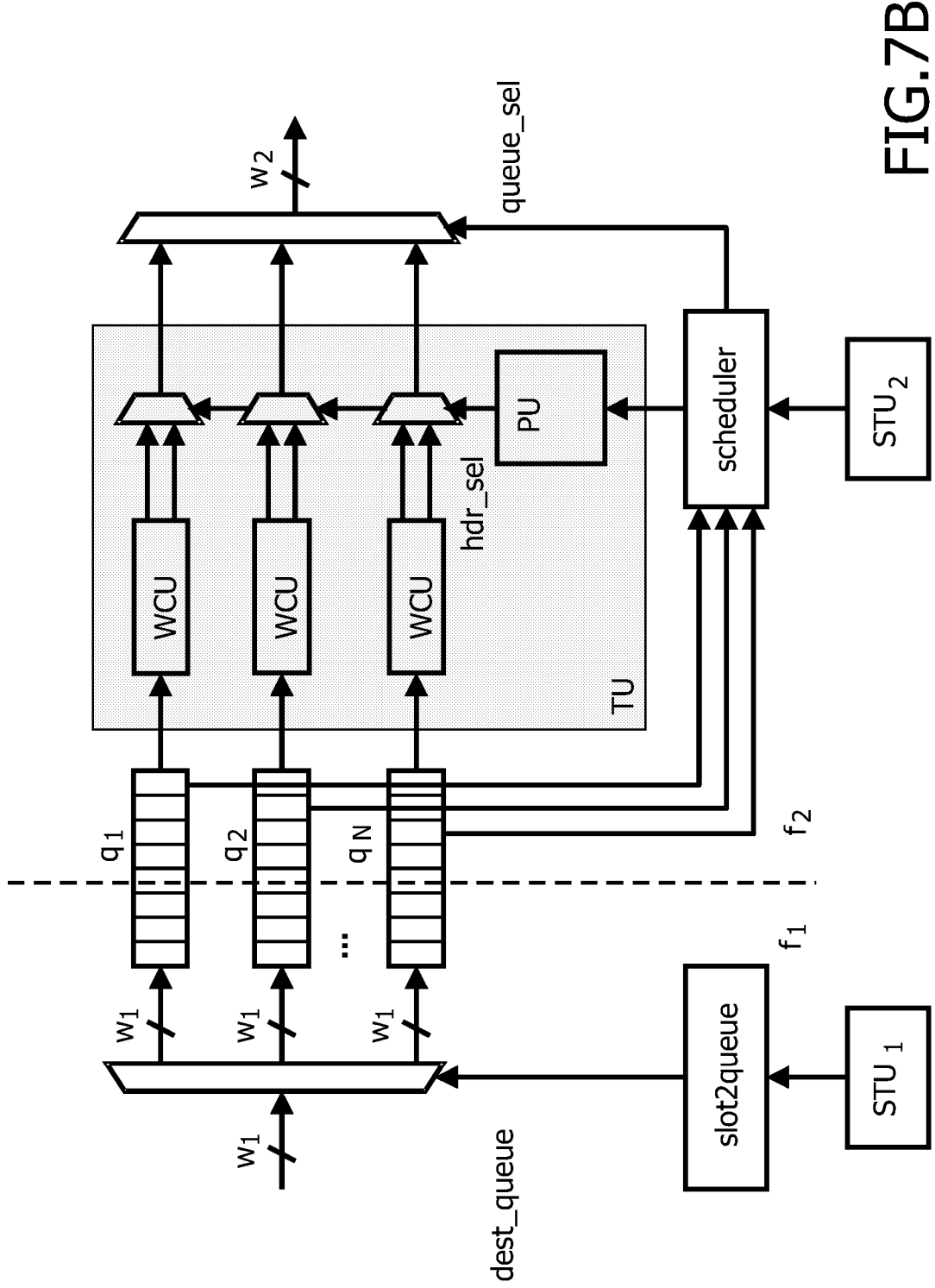
FIG. 7B illustrates a second example of an architecture for the conversion unit according to the invention.

FIG. 7B illustrates a second example of an architecture for the conversion unit according to the invention. In this example, the input side of the conversion unit is described in greater detail. A selection unit slot2queue computes the destination queue for a flit as a function of the current slot ($STU_1$). A flit (flow control unit) is a data element, an integral number of which fits into one slot. Examples of such functions are:

if there is only one queue, then slot2queue(s)=1 (always use queue $q_1$, as it is the only one);
if the number of queues is equal to the number of slots in $STU_1$, then e.g., we can use the identity function: for a slot s, slot2queue(s)=s (flit is directed to the s-th queue);
if there are Q queues, then e.g., slot2queue(s)=s % Q;

slot2queue(s) may be a programmable table, which is filled in by the user at configuration time.

As an alternative there is another way to map slots to queues. The destination queue $q_1$, $q_2$, ... $q_N$, to which the flit in a slot should be directed can be encoded in the header of the packet to which the flit belongs. For the implementation some header space is required, in particular log 2(#queues) bits, wherein #queues is the number of queues. However, it saves the cost of implementing a slot table and a mapping function in the conversion unit. The identifier (code for the destination queue) should then be stored in the network interface that communicates via the conversion unit.

It is remarked that the scope of protection of the invention is not restricted to the embodiments described herein. Neither is the scope of protection of the invention restricted by the reference symbols in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

The invention claimed is:

1. A data processing system on at least one integrated circuit, the data processing system comprising at least two modules and an interconnect arranged to transmit data between the modules, wherein the interconnect comprises a first sub-interconnect and a second sub-interconnect, the first sub-interconnect using a first scheme for reservation of resources and the second sub-interconnect using a second scheme for reservation of resources, wherein the data processing system further comprises a conversion unit, the conversion unit being arranged to convert first data into second data, the first data being controlled by the first scheme for reservation of resources and the second data being controlled by the second scheme for reservation of resources; wherein the first scheme for reservation of resources and the second scheme for reservation of resources comprise slot tables for controlling transmission of data; and wherein the first sub-interconnect and the second sub-interconnect deploy different slot table sizes, and wherein the conversion unit is arranged to convert slot assignments for the first data into slot assignments for the second data.

2. The data processing system as claimed in claim 1, wherein the first scheme for reservation of resources is conceived to reserve bandwidth and/or latency for the transmission of the first data, and wherein the second scheme for reservation of resources is conceived to reserve bandwidth and/or latency for the transmission of the second data.

3. The data processing system as claimed in claim 1, wherein the first scheme for reservation of resources is the same as the second scheme for reservation of resources.

4. The A data processing system as claimed in claim 1, wherein the first sub-interconnect and the second sub-interconnect have different operating frequencies.

5. The data processing system as claimed in claim 1, wherein the first data and the second data are formatted with different word widths.

6. The data processing system as claimed in claim 1, wherein the first sub-interconnect and the second sub-interconnect reside on different integrated circuits.

7. The data processing system as claimed in claim 1, wherein the first sub-interconnect and the second sub-interconnect reside on a single integrated circuit, and wherein the first sub-interconnect and the second sub-interconnect have different power and/or voltage domains.

8. A method for converting data in a data processing system on at least one integrated circuit, the data processing system comprising at least two modules and an interconnect which transmits data between the modules, wherein the interconnect comprises a first sub-interconnect and a second sub-interconnect, the first sub-interconnect using a first scheme for reservation of resources and the second sub-interconnect using a second scheme for reservation of resources, wherein the method comprises the acts of:

converting first data into second data, the first data being controlled by the first scheme for reservation of resources and the second data being controlled by the second scheme for reservation of resources;

controlling transmission of data using slot tables for the first scheme for reservation of resources and the second scheme for reservation of resources, wherein the first sub-interconnect and the second sub-interconnect deploy different slot table sizes; and converting slot assignments for the first data into slot assignments for the second data by the conversion unit.

9. A data processing system on at least one integrated circuit, the data processing system comprising:

at least two modules and an interconnect arranged to transmit data between the modules, wherein the interconnect comprises a first sub-interconnect and a second sub-interconnect, the first sub-interconnect using a first scheme for reservation of resources and the second sub-interconnect using a second scheme for reservation of resources; and a conversion unit between the at least two modules, wherein the conversion unit is configured to hide properties of the at least two modules from each other, the conversion unit being further configured to translate between two different protocols of the at least two modules and to convert first data into second data, the first data being controlled by the first scheme for reservation of resources and the second data being controlled by the second scheme for reservation of resources.

10. The data processing system of claim 9, wherein the first scheme for reservation of resources and the second scheme for reservation of resources comprise slot tables for controlling transmission of data; and wherein the conversion unit is configured to convert slot assignments for the first data into slot assignments for the second data.

11. The data processing system of claim 10, wherein the first sub-interconnect and the second sub-interconnect deploy different slot table sizes.

12. The data processing system of claim 10, wherein a connection which needs X slots in a slot table of a first module of the at least two modules, requires a reservation of Y slots in a slot table of a second module of the at least two modules, wherein X and Y conform to the following formula:

$$Y = \text{ceil}(X^* f_{L1}/f_{L2} * S_{L2}/S_{L1}),$$

wherein:

$f_{L1}$ is a an operating frequency of the first module,
$f_{L2}$ is an operating frequency of the second module,
$S_{L1}$ is a slot table size of the first module,
$S_{L2}$ is a slot table size of the second module, and
'ceil' is a function for rounding up a result of the formula to an integer.

13. The data processing system of claim 9, wherein the at least two modules have different operating frequencies, different clock phases, different power domains, different routing methods, different flow control methods, different TDMA slot table sizes, and different quality-of-service regimes.

* * * * *